United States Patent
Huang

(10) Patent No.: US 8,246,337 B2
(45) Date of Patent: Aug. 21, 2012

(54) MULTI-CAVITY MOLD

(75) Inventor: Chien-Feng Huang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 196 days.

(21) Appl. No.: 12/718,095

(22) Filed: Mar. 5, 2010

(65) Prior Publication Data

US 2011/0020487 A1 Jan. 27, 2011

(30) Foreign Application Priority Data

Jul. 23, 2009 (CN) .......................... 2009 1 0304705

(51) Int. Cl.
*B29C 43/32* (2006.01)

(52) U.S. Cl. ................... 425/185; 425/186; 425/192 R; 425/556

(58) Field of Classification Search .................. 425/183, 425/185, 186, 190, 192 R, 556, 572
See application file for complete search history.

(56) References Cited

U.S. PATENT DOCUMENTS

| | | | | |
|---|---|---|---|---|
| 4,019,711 A | * | 4/1977 | Altenhof et al. | 249/59 |
| 4,416,604 A | * | 11/1983 | Bender et al. | 425/183 |
| 7,134,864 B2 | * | 11/2006 | Yang et al. | 425/195 |

* cited by examiner

*Primary Examiner* — Richard Crispino
*Assistant Examiner* — Thukhanh Nguyen
(74) *Attorney, Agent, or Firm* — Altis Law Group, Inc.

(57) ABSTRACT

A multi-cavity mold includes a female die and a male die for molding products with the female die. The female die core includes a female die body and a number of female die cores received in the female die body. The male die consists of a male die body, a number of male die cores each corresponding to one female die core received in the male die body, and an ejection member. The male die body consists of a first plate, a second plate connected to the first plate, and a plurality of restricting plates corresponding to the plurality of male die cores. The first plate defining a number of male die cavities each receive a corresponding male die core therein. The restricting plates are fixed onto the first plate and configured to restrict the male die cores in the corresponding male die cavities.

12 Claims, 1 Drawing Sheet

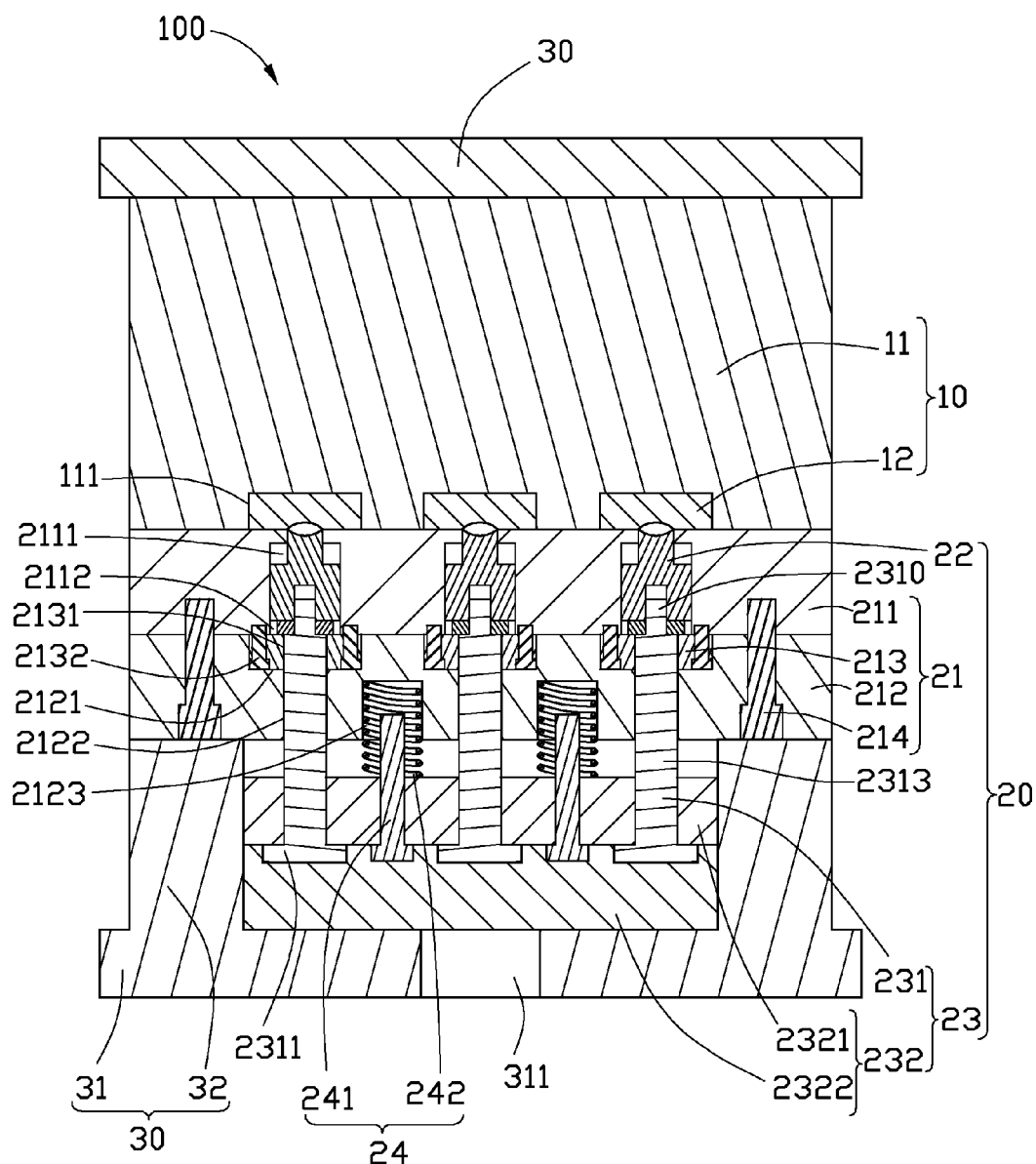

MULTI-CAVITY MOLD

BACKGROUND

1. Technical Field

The present disclosure relates to molds, and particularly, to a multi-cavity mold.

2. Description of Related Art

Multi-cavity molds are employed to simultaneously mold a number of products. Multi-cavity molds typically include a male die and a female die. The male die includes a body, a number of cores positioned in the body and a number of ejection members each connected to a corresponding core. The body defines a number of cavities each for receiving a corresponding core therein. When the products have been molded, each ejection member is driven to move the corresponding core for ejecting the molded products out of the male die. The cores are moved to original positions under the driving of the ejection members. In detail, the body includes a first plate and a second plate connected to the first plate. The first plate and the second plate are configured for restricting the cores therebetween. If any of the cores and/or cavities of the multi-cavity mold is/are damaged, the first plate and the second plate are disassembled in order to repair the damaged core(s) and/or cavity(s). Afterwards, the core(s) should be positioned again in corresponding cavity(ies) to ensure the accuracy of the multi-cavity mold. However, because all of the cores are restricted by the first and second plates, even if there is only one core or cavity needing to be repaired, the positioning accuracy of the other cores may be influenced by the disassembling of the first and second plates. Subsequently, after repair, all of the cores should be repositioned. This is cumbersome and inefficient.

What is needed therefore, is a multi-cavity mold to overcome the above-mentioned problems.

BRIEF DESCRIPTION OF THE DRAWINGS

The components of the drawings are not necessarily drawn to scale, the emphasis instead being placed upon clearly illustrating the principles of the embodiments of the multi-cavity mold. Moreover, in the drawings, like reference numerals designate corresponding parts throughout several views.

The FIGURE is a sectional view of a multi-cavity mold, according to an exemplary embodiment of the present disclosure.

DETAILED DESCRIPTION

Referring to the FIGURE, a multi-cavity mold 100, according to an exemplary embodiment, is shown. The multi-cavity mold 100 includes a female die 10 and a male die 20 configured for molding products with the female die 10.

The female die 10 includes a female die body 11 and a number of female die cores 12 positioned in the female die body 11. The female die body 11 defines a number of female die cavities 111 each for receiving a corresponding female die core 12 therein.

The male die 20 includes a male die body 21, a number of male die cores 22 positioned in the male die body 21 corresponding to the female die cores 12, and an ejection member 23 connected to the male die cores 22.

The male die body 21 includes a first plate 211, a second plate 212, and a number of restricting plates 213. The first plate 211 and the second plate 212 are connected to each other, and the restricting plates 213 are received in the second plate 212 corresponding to the male die cores 12. The first plate 211 and the second plate 212 are connected to each other through a number of first screws 214. The first plate 211 defines a number of male die cavities 2111 each for receiving a corresponding male die core 22 therein. The second plate 212 defines a number of receiving holes 2121 each for receiving a corresponding restricting plate 213 therein, and the bottom surface of each receiving hole 2121 defines a first through hole 2122 passing through the second plate 212. The restricting plates 213 are received in the receiving holes 2121 and cover entrances 2112 of the male die cavities 2111 for preventing the male die cores 22 from sliding out of the male die cavities 2111 through the entrances 2112. Each of the restricting plates 213 defines a second through hole 2131 corresponding to a respective one of the first through holes 2122. The diameter of each male die core is slightly smaller than that of the corresponding male die cavity 2111. The diameter of each first through hole 2122 is substantially identical to these that of the corresponding second through hole 2131. The diameter of each second through hole 2131 is less than that of the corresponding male die core 22.

Each of the restricting plates 213 is fixed on the first plate 211 with a number of second screws 2132.

The ejection member includes a number of ejection rods 231 corresponding to the male die cores 22 and an ejection plate 232. Each of the ejection rods 231 includes a first portion 2310, a second portion 2313, and a cap 2311 formed on an end of the second portion 2313 away from the first portion 2310. The diameter of the first portion 2310 is less than that of the second portion 2313. The first portion 2310 is fixed to a corresponding male die core 22, and the cap 2311 is fixed to the ejection plate 232. The ejection plate 232 includes a first ejection plate 2321, and a second ejection plate 2322 connected to the first ejection plate 2321. The ejection rods 231 pass through the first ejection plate 2321, and the caps 2311 of the ejection rods 231 are received in the second ejection plate 2322.

The male die 20 further includes a number of restoring members 24 mounted between the male die body 21 and the ejection plate 232. The restoring member 24 is configured for restoring the male die cores 22 after the products are ejected out of the male die 20. Each of the restoring members 24 includes a guiding rod 241 and an elastic member 242. Corresponding to the restoring member 24, the second plate 212 defines a number of blind holes 2123 in a surface opposite the first ejection plate 2321. One end of each guiding rod 241 is received in the second ejection plate 2322, and the other end is inserted into a corresponding blind hole 2123. One end of each elastic member 242 is received in a corresponding blind hole 2123 adjoining the bottom surface of the blind hole 2123, and the other end adjoins the first ejection plate 2321. In this embodiment, each elastic member 242 is a compression spring, and each elastic member 242 sleeves on a corresponding guiding rod 241.

The multi-cavity mold 100 further includes two fixing plates 30 configured for fixing the female die 10 and the male die 20 therebetween. The fixing plate 30 on a side near the male die 20 includes a bottom plate 31 and a side plate 32 connected to the bottom plate 31. The bottom plate 31 defines an opening 311 for a pushing device (not shown) inserting therein for pushing the ejection plate 232.

When products have been molded, the female die 10 is removed and the ejection member 23 is pushed to drive the male die cores 22 to move so that the products are ejected out of the male die 20 accordingly. The male die cores 22 are then restored to original positions under force of the restoring members 24. If any of the male die cores 22 and/or the male die cavities 2111 gets damaged, then, firstly, the first plate 211 and the second plate 212 are disassembled. Secondly, the restricting plate(s) 213 corresponding to the damaged male die core(s) 22 and/or the male die cavity(s) 2111 are disassembled. When the male die core(s) 22 and/or the male die cavity(s) 2111 is/are repaired, the male die core(s) 22 is/are put into the corresponding male die cavity(s) 2111 and the corresponding restricting plate(s) 213 is assembled to the first plate 211 again to fix the male die core(s) 22 in the male die cavity(s) 2111. Because the other male die cores 22, which do not need to be repaired, are still restricted in the corresponding male die cavities 2111 by the corresponding restricting plates 213, they are not adversely affected by the repairs.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A multi-cavity mold, comprising:
a female die comprising a female die body and a plurality of female die cores received in the female die body; and
a male die configured for molding products with the female die, the male die comprising a male die body, a plurality of male die cores each corresponding to one female die core and received in the male die body, and an ejection member, the male die body comprising a first plate, a second plate connected to the first plate, and a plurality of restricting plates corresponding to the male die cores, the first plate defining a plurality of male die cavities, each male die core totally received in a corresponding male die cavity, the restricting plates fixed on the first plate and configured for restricting the male die cores in the corresponding male die cavities, the second plate defining a plurality of receiving holes, the restricting plates being received in the corresponding receiving holes, and the ejection member passing through the first plate and the restricting plates and connected to the male die cores.

2. The multi-cavity mold of claim 1, wherein the female die body defines a plurality of female die cavities each for receiving a corresponding female die core therein.

3. The multi-cavity mold of claim 1, wherein the bottom surface of each receiving hole defines a first through hole passing through the second plate, and each restricting plate covers a corresponding male die cavity and defines a second through hole corresponding to a respective one of the first through holes.

4. The multi-cavity mold of claim 1, wherein the ejection member comprises a plurality of ejection rods corresponding to the male die cores and an ejection plate, one end of each ejection rod is fixed to the corresponding male die core, and the other end of each ejection rod is fixed to the ejection plate.

5. The multi-cavity mold of claim 4, wherein each of the ejection rods comprises a cap on an end thereof connected to the ejection plate, the ejection plate comprises a first ejection plate and a second ejection plate connected to the first ejection plate, the ejection rods pass through the first ejection plate, and the caps of the ejection rods are received in the second ejection plate.

6. The multi-cavity mold of claim 1, wherein the male die comprises a plurality of restoring members mounted between the male die body and the ejection plate of the ejection member and configured for restoring the male die cores after the products are ejected out of the male die.

7. The multi-cavity mold of claim 6, wherein the each of the restoring members comprises a guiding rod and an elastic member, the second plate defines a plurality of blind holes in a surface opposite the ejection plate, one end of each guiding rod is received in the first ejection plate and the second ejection plate, the other end of each guiding rod is inserted into a corresponding blind hole, one end of each elastic member is received in a corresponding blind hole adjoining the bottom surface of the blind hole, and the other end of each elastic member adjoins the ejection plate.

8. The multi-cavity mold of claim 7, wherein each elastic member is a compression spring, and each elastic member sleeves on a corresponding guiding rod.

9. The multi-cavity mold of claim 1, further comprising two fixing plates configured for fixing the female die and the male die therebetween.

10. The multi-cavity mold of claim 9, wherein the fixing plate on a side near the male die comprises a bottom plate and a side plate connected to the bottom plate, and the bottom plate defines an opening for a pushing device inserting therein for pushing the ejection plate.

11. The multi-cavity mold of claim 5, wherein each of the ejection rods further comprises a first portion and a second portion, the cap is formed on an end of the second portion away from the first portion, the diameter of the first portion is less than that of the second portion, and the first portion is fixed to the corresponding male die core.

12. The multi-cavity mold of claim 1, wherein each of the restricting plates covers an entrance of a corresponding male die cavity in which the corresponding male die core is inserted, for preventing the male die core from sliding out of the male die cavity through the entrance.

* * * * *